(12) United States Patent
    Petcavich

(10) Patent No.: US 9,158,144 B2
(45) Date of Patent: Oct. 13, 2015

(54) POLARIZER CAPACITIVE TOUCH SCREEN

(71) Applicant: UNIPIXEL DISPLAYS, INC., The Woodlands, TX (US)

(72) Inventor: Robert J. Petcavich, The Woodlands, TX (US)

(73) Assignee: UNIPIXEL DISPLAYS, INC., The Woodlands, TX (US)

( * ) Notice: Subject to any disclaimer, the term of this patent is extended or adjusted under 35 U.S.C. 154(b) by 280 days.

(21) Appl. No.: 13/980,225

(22) PCT Filed: Oct. 25, 2012

(86) PCT No.: PCT/US2012/061776
    § 371 (c)(1),
    (2) Date: Jul. 17, 2013

(87) PCT Pub. No.: WO2013/063183
    PCT Pub. Date: May 2, 2013

(65) Prior Publication Data
    US 2014/0071356 A1    Mar. 13, 2014

Related U.S. Application Data

(60) Provisional application No. 61/551,183, filed on Oct. 25, 2011.

(51) Int. Cl.
    *G02F 1/1335*    (2006.01)
    *G02F 1/1333*    (2006.01)
    *G06F 3/044*     (2006.01)
    *B41F 5/24*      (2006.01)

(52) U.S. Cl.
    CPC .............. *G02F 1/13338* (2013.01); *B41F 5/24* (2013.01); *G06F 3/044* (2013.01); *B41P 2200/12* (2013.01); *G06F 2203/04103* (2013.01); *Y10T 29/49105* (2015.01)

(58) Field of Classification Search
    CPC .................. G02F 1/13338; G02F 2001/13312; G02F 1/133528; G02F 1/133536; G02F 3/0412; G02F 3/045; G02F 3/044; G02B 5/3033
    USPC ...................................... 349/12, 96
    See application file for complete search history.

(56) References Cited

U.S. PATENT DOCUMENTS

| 6,395,863 | B2* | 5/2002 | Geaghan ....................... 528/196 |
| 6,587,168 | B2  | 7/2003 | Jones et al. |
| 7,911,563 | B2  | 3/2011 | Hung |
| 2002/0149572 | A1* | 10/2002 | Schulz et al. .................. 345/174 |
| 2005/0083307 | A1* | 4/2005 | Aufderheide et al. ........ 345/173 |
| 2007/0134837 | A1  | 6/2007 | Sato et al. |
| 2008/0129317 | A1* | 6/2008 | Oba ............................... 324/663 |
| 2009/0219258 | A1* | 9/2009 | Geaghan et al. .............. 345/173 |
| 2010/0026939 | A1  | 2/2010 | Shibuta et al. |

OTHER PUBLICATIONS

PCT/US2012/061776 International Search Report and Written Opinion dated Feb. 27, 2013 ( 11 pgs.).

* cited by examiner

*Primary Examiner* — Mike Qi
(74) *Attorney, Agent, or Firm* — Conley Rose, P.C.

(57) ABSTRACT

Touch screen structures may have a capacitive touch sensor made up of a polarizer film or analyzer. Disclosed herein is a method of producing a capacitive touch sensor using a roll-to-roll handling system comprising: printing, by a first flexoplate and a first ink, a first pattern on a first side of a polarizer film. A second pattern is printed by a second flexoplate and a second ink on the second side of the film. The film is cured and the first and the second pattern are plated and assembled.

20 Claims, 11 Drawing Sheets

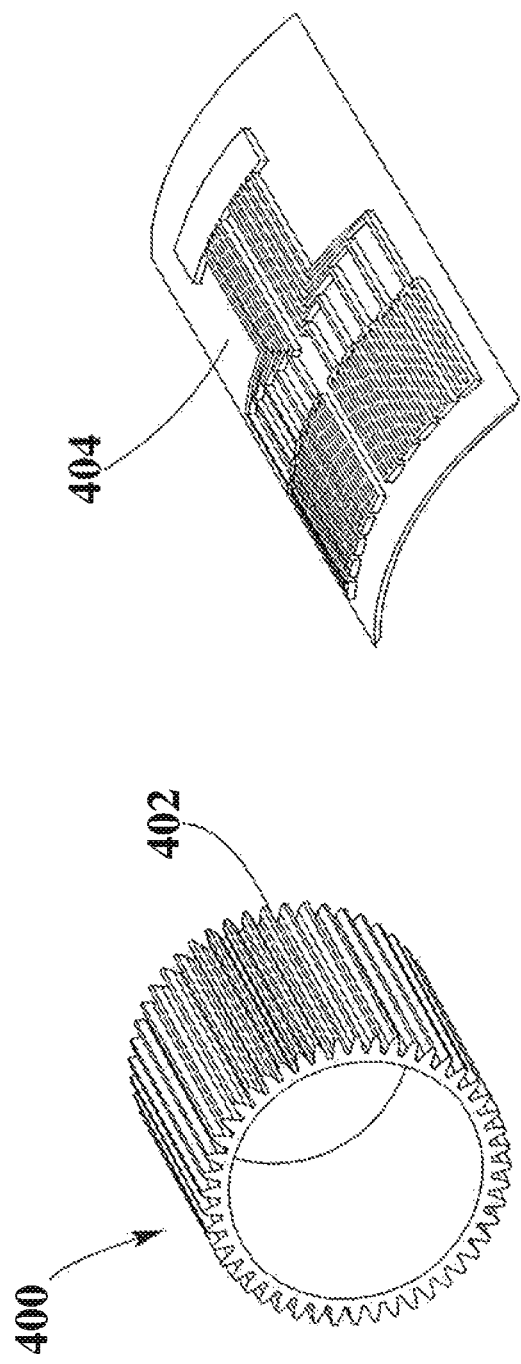
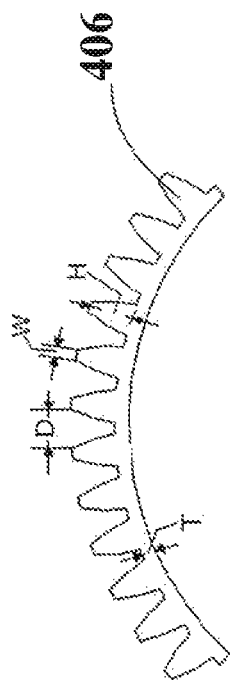
Fig. 3B
Fig. 3C
Fig. 3A

POLARIZER CAPACITIVE TOUCH SCREEN

CROSS-REFERENCE TO RELATED APPLICATION

The present application claims priority to U.S. Provisional Patent Application No. 61/551,183, filed on Oct. 25, 2011; which is hereby incorporated herein by reference.

BACKGROUND

Touch screen technology, for example, as is used in LCD or other display screens, may use Projected Capacitive Touch technology (PCT). PCT touch screens may comprise a matrix of conductive material arranged in layered sheets of glass. The conductive material may be etched on an X and a Y axis of one or more substrates and assembled to form an X-Y grid. This grid forms an electrostatic field when voltage is applied and when a conductive object, for example, a finger or a stylus, disrupts or distorts the field, this change in capacitance can be measured to track the disruptions caused by the finger contact.

SUMMARY

In an embodiment, a method of producing a capacitive touch sensor using a roll-to-roll handling system comprising: printing, by a first flexoplate and a first ink, a first pattern on a first side of a polarizer film, wherein the first pattern comprises a plurality of lines and a first tail; and printing, by a second flexoplate and a second ink, a second pattern on the first side of the polarizer film, wherein the second pattern comprises a second plurality of lines and a second tail, and wherein the second pattern is printed adjacent to the first pattern. The embodiment further comprising curing the printed polarizer film; plating the first and the second pattern; and assembling the first and the second patterns so that the first plurality of lines is oriented orthogonally to the second plurality of lines.

In an alternate embodiment, a method of making a projected capacitance LCD touch screen comprising a capacitive touch sensor, wherein the capacitive touch sensor comprises: printing by a flexographic printing process a first pattern on a first side of a first film using a first flexoplate and an ink, wherein the first pattern comprises a first plurality of lines; curing the first film; plating the first film; and cleaning a second film. The embodiment further comprising printing a second pattern on a first side of the second film using a second flexoplate, wherein the second pattern comprises a second plurality of lines; curing the second film; plating the second film; and assembling the first and the second films so that the first and second pluralities of lines are orthogonal to each other.

In an embodiment, a capacitive touch sensor comprising a flexible polarizer film comprising a first side and a second side, wherein the first side comprises a first pattern printed by a flexographic printing process comprising a first plurality of lines and a first tail, and wherein the second side comprises a second pattern comprising a second plurality of lines and a second tail; wherein the first and the second patterns are printed by a flexographic printing process using ink containing a catalyst, and wherein the first and the second patterns are plated by electroless plating using a conductive material; and wherein the first and the second patterns are printed so that the first plurality of lines and the second plurality of lines are oriented orthogonally to each other.

BRIEF DESCRIPTION OF THE DRAWINGS

For a detailed description of exemplary embodiments of the invention, reference will now be made to the accompanying drawings in which:

FIGS. 3A-3C are illustrations of isometric and cross-sectional views of patterned flexo-masters.

DETAILED DESCRIPTION

Figure 1:
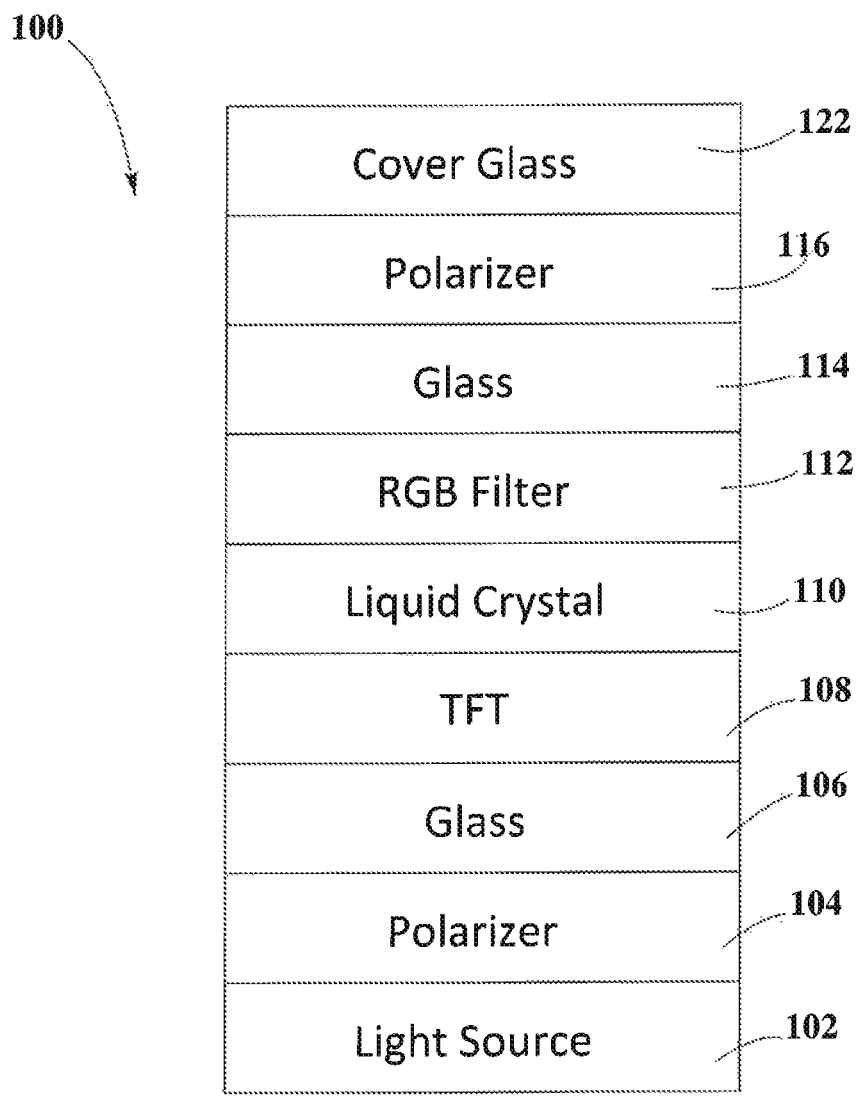
FIG. 1 is an illustration of an embodiment of a touch screen configuration.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Capacitive touch sensors may be used in electronic devices with touch-sensitive features. These electronic devices may include display devices such a computing device, a computer display, or a portable media player. Display devices may include televisions, monitors and projectors that may be adapted to displays images, including text, graphics, video images, still images or presentations. The image devices that may be used for these display devices may include cathode ray tubes (CRTs), projectors, flat panel liquid crystal displays (LCDs), LED systems, OLED systems, plasma systems, electroluminescent displays (ELDs), field emissive displays (FEDs). As the popularity of touch screen devices increases, manufacturers may seek to employee methods of manufacture that will preserve quality while reducing the cost of manufacture and simplify the manufacturing process. The optical performance of touch screens may be improved by reducing optical interference, for example the moire effect that is generated by regular conductive patterns formed by photolithographic processes. Systems and methods of fabricating flexible and optically compliant touch sensors in a high-volume roll-to-roll manufacturing process where micro electrically conductive features can be created in a single pass are disclosed herein.

Two types of PCT technology which may be utilized in display screens are which can utilize either mutual capacitance or self-capacitance. A self capacitance touch sensor may comprise a plurality of electrode lines along an X-axis and a Y-axis. In this example, each of the plurality of lines are pulsed and two fingers on any axis line of the plurality of lines produces the same result as having only one finger on that line. In this embodiment, first finger or stylus position and second finger or stylus position are read as one finger position. The other position may be referred to as a "ghost."

In contrast, to a self-capacitance sensor, mutual capacitance sensors are comprised of an x-y grid where there is a capacitor at every intersection of each row and column of a first and a second assembled substrates or, in another example, a first substrate that has a pattern printed on a x-axis and a pattern printed on a y-axis and then cut and assembled to orient the patterns orthogonally. In a mutual capacitance sensor each of the plurality of lines along the X-axis are pulsed with voltage in turn and the plurality of lines along the Y-axis are scanned for changes in capacitance. Each node, wherein a node may comprise an x-y intersection, is individually address and an image of which nodes are touch is built up by measuring the voltage to determine the touch location. It should be noted that nodes are located at every intersection of the plurality of lines. In an embodiment, this allows multi-touch operation wherein multiple fingers, stylus, palms, or other conductive implements can be accurately tracked which allows for multi-point control and manipulation of the touch screen.

Disclosed herein are embodiments of a system and a method to fabricate a polarizing capacitive flexible touch sensor (FTS) circuit by, for example, a roll-to-roll manufacturing process. A plurality of master plates may be fabricated using thermal imaging of selected designs in order print high resolution conductive lines on a substrate. A first pattern may be printed using a first roll on a first side of the substrate, and a second pattern may be printed using a second roll on a second side of the substrate. Electroless plating may be used during the plating process. While electroless plating may be more time consuming than other methods, it may be better for small, complicated, or intricate geometries. The FTS may comprise a plurality of thin flexible electrodes in communication with a dielectric layer. An extended tail comprising electrical leads may be attached to the electrodes and there may be an electrical connector in electrical communication with the leads. The roll-to-roll process refers to the fact that the flexible substrate is loaded on to a first roll, which may also be referred to as an unwinding roll, to feed it into the system where the fabrication process occurs, and then unloaded on to a second roll, which may also be referred to as a winding roll, when the process is complete.

Touch sensors may be manufactured using a thin flexible substrate transferred via a known roll-to-roll handling method. The substrates is transferred into a washing system that may comprise a process such as plasma cleaning, elastomeric cleaning, ultrasonic cleaning process, etc. The washing cycle may be followed by thin film deposition in physical or chemical vapor deposition vacuum chamber. In this thin film deposition step, which may be referred to as a printing step, a transparent conductive material, such as Indium Tin Oxide (ITO), is deposited on at least one surface of the substrate. In some embodiments, suitable materials for the conductive lines may include copper (Cu), silver (Ag), gold (Au), nickel (Ni), tin (Sn) and Palladium (Pd) among others. Depending on the resistivity of the materials used for the circuit, it may have different response times and power requirements. The deposited layer of conductive material may have a resistance in a range of 0.005 micro-ohms to 500 ohms per square, a physical thickness of 500 angstroms or less, and a width of 25 microns or more. In some embodiments, the printed substrate may have anti-glare coating or diffuser surface coating applied by spray deposition or wet chemical deposition. The substrate may be cured by, for example, heating by infrared heater, an ultraviolet heater convection heater or the like. This process may be repeated and several steps of lamination, etching, printing and assembly may be needed to complete the touch sensor circuit.

The pattern printed may be a high resolution conductive pattern comprising a plurality of lines. In some embodiments, these lines may be microscopic in size. The difficulty of printing a pattern may increase as the line size decreases and the complexity of the pattern geometry increases. The ink used to print features of varying sizes and geometries may also vary, some ink compositions may be more appropriate to larger, simple features and some more appropriate for smaller, more intricate geometries.

In an embodiment, there may be multiple printing stations used to form a pattern. These stations may be limited by the amount of ink that can be transferred on an anilox roll. In some embodiments, there may be dedicated stations to print certain features that may run across multiple product lines or applications, these dedicates stations may, in some cases, use the same ink for every printing job or may be standard features common to several products or product lines which can then be run in series without having to change out the roll. The cell volume of an anilox roll or rolls used in the transfer process, which may vary from 0.5-30 BCM (billion cubic microns) in some embodiments and 9-20 BCM in others, may depend on the type of ink being transferred. The type of ink used to print all or part of a pattern may depend on several factors, including the cross-sectional shape of the lines, line thickness, line width, line length, line connectivity, and overall pattern geometry. In addition to the printing process, at least one curing process may be performed on a printed substrate in order to achieve the desired feature height.

FIG. 1 shows structure 100, which is a conventional touch screen configuration. Structure 100 includes a conventional touch sensor. FIG. 1 includes a light source 102. A backlight is one type of source of illumination used in touch screens. A backlight may include a light source, enhancement films, and diffuser plates. Light sources for backlighting include electroluminescent panels (ELP), Cold cathode fluorescent lamps (CCFL), hot cathode fluorescent lamps (HCFL), Woven fiber optic mesh, incandescent lamps, and light emitting diodes (LED). The diffuser plates together with other components of backlight 102 create a uniform distribution of the light emitted from the light source to first polarizer 104. First polarizer 104 polarizes the light beams emitted by backlight 102 and passes only light with certain linear polarization. The most common commercially available polarizers are made of highly uniaxially oriented polymeric materials containing dichroic dye molecules or crystals. In an embodiment, the high dichroic ration polarizer is an iodine polarizer composed of thin polyvinyl alcohol (PVA) film containing elongated iodine complexes. Such polarizers require a high molecular order for the absorbing material; this order is achieved by the adsorption of the dye into a stretched film of PVA. These dichroic polarizers may be based on dichroic materials with a rod-like molecular or crystalline structure whose long molecular or crystal axis is almost parallel to the transition moment of the light absorption. The polymer absorbs dichroic liquid so the iodine ions or dye ions extend into the inside of the polymer. The polymer is heated and stretched so it becomes a PVA membrane. In a preferred embodiment, the penetration should be about 5%. The other 95% is refracted, reflected or absorbed by the layers of the film. Such polarizers absorb the light polarized along the long molecular axis and transmit most of the light polarized in all directions orthogonal to this axis. The absorption rate and the transmittance of the dichroic polarizers are two factors that affect the brightness of liquid crystal displays (LCDs). The mechanical properties of the polarizer film, such as resistance to temperature and humidity may not be optimal to provide protection to the polarizing layer, films of triacetyl cellulose (TAC) may be used to protect the polarizing layer. The body of iodine polarizing film is usually coated with TAC protective film on the upper and lower sides; these protective layers may have a thickness of up to 200 microns.

Turning back to FIG. 1, a liquid crystal layer 110 is sandwiched between TFTs 108 (thin film transistors) and RGB (red green and blue) filter 112. Glass substrate 106 carries TFTs 108 and glass substrate 114 carries RGB filter 112. According to the basic structure of the color filter, a primary three color pattern (red, green and blue) is formed over a black matrix. This black matrix of chrome or resin is previously formed on glass substrate 114, to prevent leakage of backlight and color crosstalk from adjacent pixels. Upon the color pattern an indium tin oxide (ITO) film is deposited. Second polarizer 116 is disposed on top of glass substrate 114. This second polarizer 116 may also be known as an analyzer. Preferably, the direction of the polarization used by the analyzer 116 is perpendicular to the direction of polarization of first polarizer 104 film.

In an embodiment, the touch screen may include cover glass 122 to protect and isolate the device from environmental conditions and protect against abrasion, normal wear, oxygen and other harmful chemical agents. Generally, glass or polyester (PET) film with a clear/hard coating are employed as protective cover layers in touch screen panels.

Figure 2:
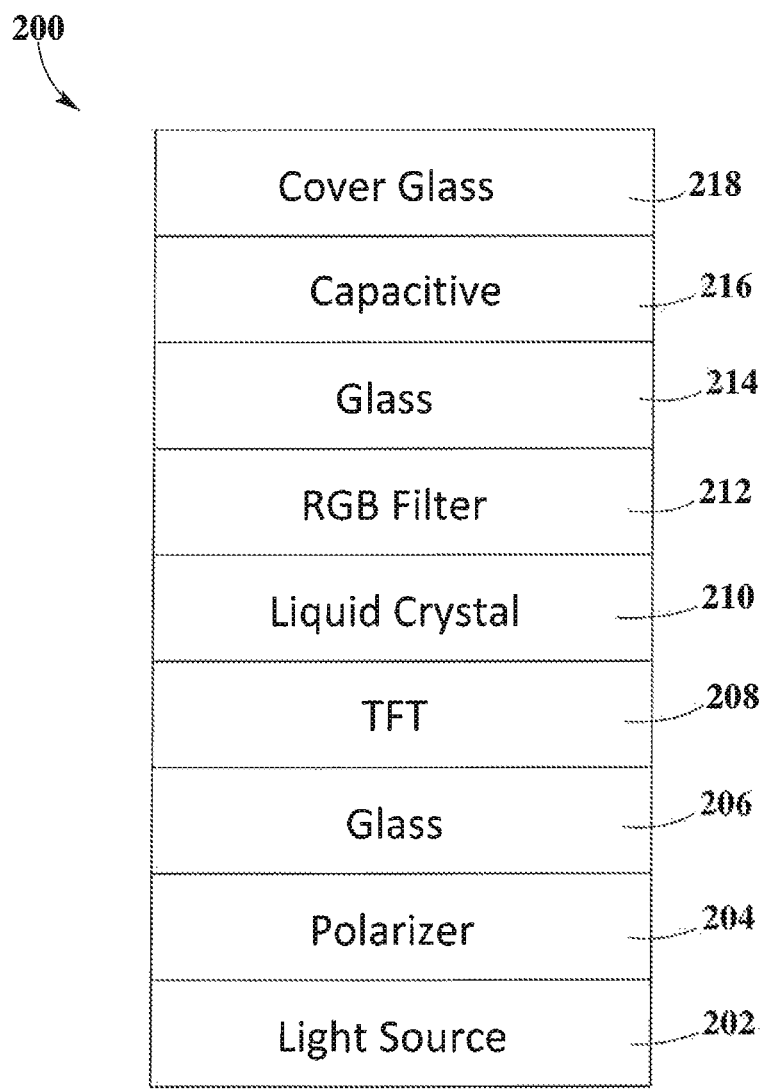
FIG. 2 is an illustration of an embodiment of a touch screen configuration with sensors.

FIG. 2 is an embodiment of a touch screen configuration. In configuration 200, a light source such as a backlight 202 generates light beams that are polarized in one linear direction (not pictured) by a first polarizer 204. Liquid crystal cells 210 are sandwiched between TFTs 208 and RGB filter 212. A first glass substrate 206 and a second glass substrate 214 encapsulate the liquid crystals cells 210. First glass substrate 206 includes TFTs 208 and glass substrate 214 includes RGB filter 212. A color filter, for example, a primary three color pattern (red, green and blue) may be formed over a black matrix. The black matrix of chrome or resin may be previously formed on glass substrate 214, to prevent leakage of backlight and color crosstalk from adjacent pixels. In an embodiment, an indium tin oxide (ITO) film is deposited on the color pattern.

A second glass substrate 214 is disposed on capacitive touch sensor 216. Touch sensor 216 is formed by conductive lines printed on both sides of a flexible polarizer film. These conductive lines may comprise a conductive microstructural pattern printed using a flexographic process and then plated which may comprise a conductive material patterned on a non-conductive substrate where the conductive material is less than 50 µm wide along the printing plane of the substrate. All materials between the two polarizers of an LCD should be optically isotropic. An LCD functions by orienting light into certain polarities, and any material which diffuses, refracts, or changes the polarity of light will reduce the performance of the LCD. Glass and some polycarbonates are examples of optically isotropic materials. In one embodiment, the preferred touch screen structure 200 may include cover glass 218 to protect and isolate the device from environment conditions and protect against abrasion, normal wear, oxygen and other harmful chemical agents. Generally, glass or polyester (PET) film with a clear/hard coating are employed as protective cover layers in touch screen panels. Alternatively, in some embodiments a hard coating may be applied directly on the outer surface of capacitive touch sensor 216 as a substitute for cover glass 218. A specially formulated UV curable coating solution comprising mono and/or multifunctional acrylic monomers and acrylic oligomers may be applied to one or both sides of touch sensor 216. The coating application methods may include but are not limited to dip coating, slot die and roll to roll printing. The high density cross-linked polymer structures formed by the cross linking of monomer chains within the coating solution may create a coating layer with a thickness from, for example, 5 to 50 microns and with a pencil hardness up to about 6 H.

Master Plate Formation

Flexography is a form of a rotary web letterpress where relief plates are mounted on to a printing cylinder, for example, with double-sided adhesive. These relief plates, which may also be referred to as a master plate or a flexoplate, may be used in conjunction with fast drying, low viscosity solvent, and ink fed from anilox or other two roller inking system. The anilox roll may be a cylinder used to provide a measured amount of ink to a printing plate. The ink may be, for example, water-based or ultraviolet (UV)-curable inks. In one example, a first roller transfers ink from an ink pan or a metering system to a meter roller or anilox roll. The ink is metered to a uniform thickness when it is transferred from the anilox roller to a plate cylinder. When the substrate moves through the roll-to-roll handling system from the plate cylinder to the impression cylinder, the impression cylinder applies pressure to the plate cylinder which transfers the image on to the relief plate to the substrate. In some embodiments, there may be a fountain roller instead of the plate cylinder and a doctor blade may be used to improve the distribution of ink across the roller.

Flexographic plates may be made from, for example, plastic, rubber, or a photopolymer which may also be referred to as a UV-sensitive polymer. The plates may be made by laser engraving, photomechanical, or photochemical methods. The plates may be purchased or made in accordance with any known method. The preferred flexographic process may be set up as a stack type where one or more stacks of printing stations are arranged vertically on each side of the press frame and each stack has its own plate cylinder which prints using one type of ink and the setup may allow for printing on one or both sides of a substrate. In another embodiment, a central impression cylinder may be used which uses a single impression cylinder mounted in the press frame. As the substrate enters the press, it is in contact with the impression cylinder and the appropriate pattern is printed. Alternatively, an inline flexographic printing process may be utilized in which the printing stations are arranged in a horizontal line and are driven by a common line shaft. In this example, the printing stations may be coupled to curing stations, cutters, folders, or other post-printing processing equipment. Other configurations of the flexo-graphic process may be utilized as well.

In an embodiment, flexo plate sleeves may be used, for example, in an in-the-round (ITR) imaging process. In an ITR process, the photopolymer plate material is processed on a sleeve that will be loaded on to the press, in contrast with the method discussed above where a flat plate may be mounted to a printing cylinder, which may also be referred to as a conventional plate cylinder. The flexo-sleeve may be a continuous sleeve of a photopolymer with a laser ablation mask coating disposed on a surface. In another example, individual pieces of photopolymer may be mounted on a base sleeve with tape and then imaged and processed in the same manner as the sleeve with the laser ablation mask discussed above. Flexo-sleeves may be used in several ways, for example, as carrier rolls for imaged, flat, plates mounted on the surface of the carrier rolls, or as sleeve surfaces that have been directly engraved (in-the-round) with an image. In the example where a sleeve acts solely as a carrier role, printing plates with engraved images may be mounted to the sleeves, which are then installed into the print stations on cylinders. These pre-mounted plates may reduce changeover time since the sleeves can be stored with the plates already mounted to the sleeves. Sleeves are made from various materials, including thermoplastic composites, thermoset composites, and nickel, and may or may not be reinforced with fiber to resist cracking and splitting. Long-run, reusable sleeves that incorporate a foam or cushion base are used for very high-quality printing. In some embodiments, disposable "thin" sleeves, without foam or cushioning, may be used.

FIGS. 3A-3C are illustrations of flexo-master embodiments. As noted above, the terms "master plate" and "flexo-master" may be used interchangeably. FIG. 3A is an isometric view 400 of a straight line flexo-master 402 which is cylindrical. FIG. 3B is an isometric view of an embodiment of a circuit-patterned flexo-master 404. FIG. 3C is a cross sectional view at block 406 of a portion of straight lines flexo-master 402 as shown in FIG. 3A. FIG. 3C also depicts "W" which is the width of the flexo-master protrusions, "D," is the distance between the center points of the plurality of protrusions 406 and "H" is the height of the protrusions 406. In an embodiment (not pictured), one or all of D, W, and H may be the same across the flexo-master. In another embodiment (not pictured), one or all of D, W, and H may vary across the flexo-master. In an embodiment (not pictured) width W of flexo-master protrusions is between 3 and 5 microns, distance D between adjacent protrusions is between 1 and 5 mm, height H of the protrusions may vary from 3 to 4 microns and thickness T of the protrusions is between 1.67 and 1.85 mm. In an embodiment, printing may be done on one side of a substrate, for example, using one roll comprising both patterns, or by two rolls each comprising one pattern, and that substrate may be subsequently cut and assembled. In an alternate embodiment, both sides of a substrate may be printed, for example, using two different print stations and two different flexo-masters. Flexo-masters may be used, for example, because printing cylinders may be expensive and hard to change out, which would make the cylinders efficient for high-volume printing but may not make that system desirable for small batches or unique configurations. Changeovers may be costly due to the time involved. In contrast, flexographic printing may mean that ultraviolet exposure can be used on the photo plates to make new plates that may take as little as an hour to manufacture. In an embodiment, using the appropriate ink with these flexo-masters may allow the ink to be loaded from, for example, a reservoir or a pan in a more controlled fashion wherein the pressure and surface energy during ink transfer may be able to be controlled. The ink used for the printing process may need to have properties such as adhesion, viscosity, and additives so that the ink stays in place when printed and does not run, smudge, or otherwise deform from the printed pattern, and so that the features formed by the ink join to form the desired features. Preferably, the ink comprises at least one catalyst that is conducive to plating, for example, electroless plating, so that the catalyst will be activated by the plating process so that the plated pattern mirrors the printed pattern as to promote the expected performance of the finished product. Each pattern may, for example, be made using a recipe wherein the recipe comprises at least one flexo-master and at least one type of ink. Different resolution lines, different size lines, and different geometries, for example may require different recipes.

Figures 4A, 4B:
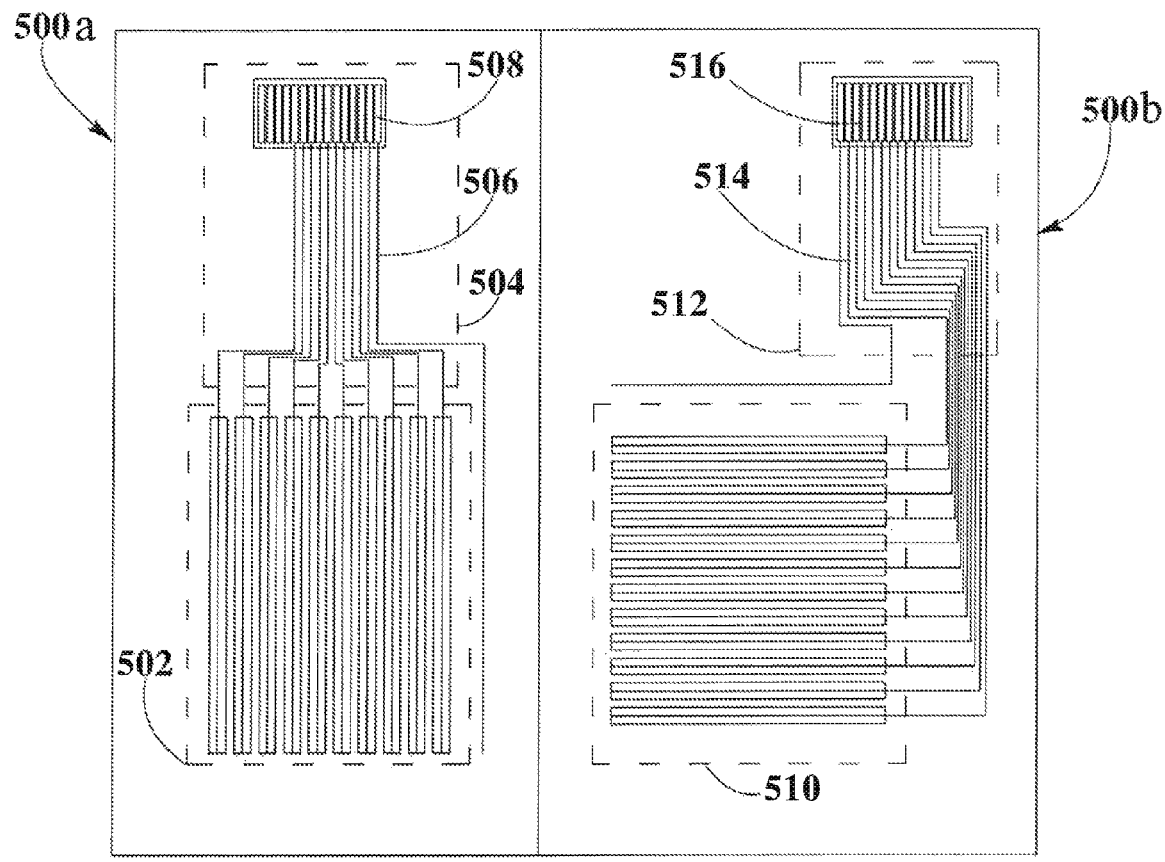
FIGS. 4A and 4B are illustrations of top views of patterned flexoplates.

FIG. 4A is an illustration of an embodiment of a top view of one side of flexible polarizer film that has a pattern 500a that is to be printed on a substrate. A first pattern 500a may be printed on one side of a first flexible polarizer film, including a first plurality of lines 502 that may constitute the Y oriented segment of an X-Y grid, and tail 504 comprising electrical leads 506 and electrical connectors 508. FIG. 4B is an illustration of an embodiment of a second pattern 500b which may be printed on one side of a second flexible polarizer film, comprising a second plurality of lines 510 that may constitute the X oriented segment of an X-Y grid (not pictured) and tail 512 comprising electrical leads 514 and electrical connectors 516. In an embodiment, booth the first and the second patterns combined will form an X-Y grid that will match in size and shape the black matrix embedded in RGB filter 212

Figure 5A:
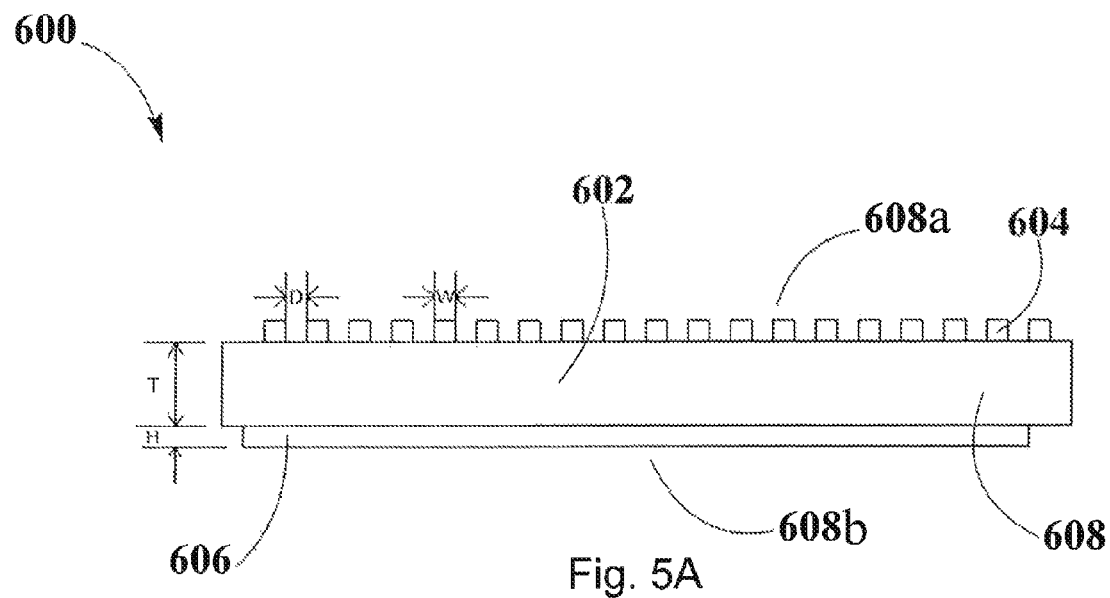
FIGS. 5A and 5B are illustrations of isometric view and a cross-sectional view of an embodiment of a capacitive touch sensor.
Figure 5B:
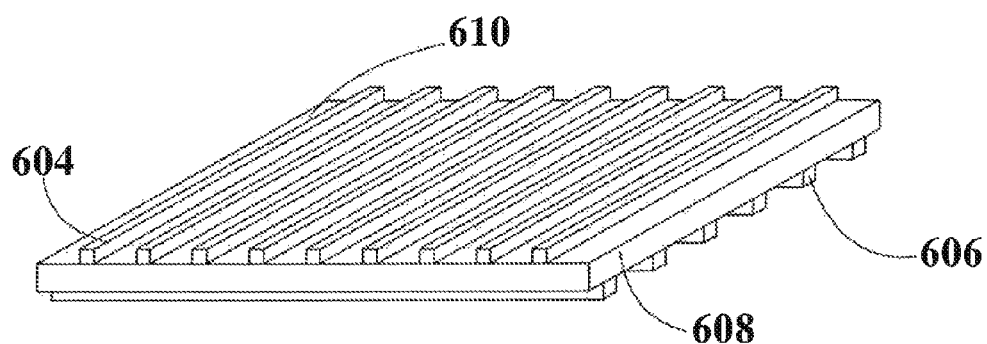

FIGS. 5A and 5B are embodiments of circuit structures. Turning to FIGS. 2 and 5A, FIG. 5A depicts circuit structure 600 which represents a cross-sectional view of capacitive touch sensor 216. Cross sectional view 602 is an example of capacitive touch sensor 216. FIG. 6B is an Isometric view 610 of capacitive touch sensor 216. The top 608a and bottom 608b sides of polarizer film 608 are coated with thin, transparent flexible patterns of conductive material. In both FIGS. 5A and 5B top electrodes 604 and bottom electrodes 606 are shown printed on the top 608a and bottom 608b of flexible polarizer film 608. Materials used for the electrodes may be, for example, copper (Cu), silver (Ag), gold (Au), nickel (Ni), tin (Sn), and Palladium (Pd). Depending on the resistivity of the materials used for the circuit, it may have different response times and power requirements. In some embodiments, the circuit lines may have a resistivity between 0.005 micro Ohms and 500 Ohm per square and response times may be in a range between nanoseconds and picoseconds. Preferably, the resistivity is between 2-10 Ohms per square. In this example "per square" refers to the square created when two patterns are assembled orthogonally to each other to form what may be referred to as a grid or an x-y grid. In general, with the above electrode metal configuration, circuits consuming 75% less power than those using ITO (Indium Tin Oxide) may be achieved.

Electrodes are comprised of a plurality of lines and a tail. In the embodiments pictured in FIGS. 5A and 5B, the cross sectional geometry of the plurality of electrode lines is a square. However, the cross sectional geometry of each of the plurality of lines may be any suitable shape such as a rectangle, a square, a trapezoid, a triangle, or a half-circle. The width W of the printed electrodes may vary from 5 to 35 microns and has a tolerance of +/−10%. The spacing D between the lines may vary from about 1 mm to 5 mm. For optimal optical performance the conductive patterns should match the size and shape of the display's black matrix. As such, spacing D and width W may be functions of the size of the black matrix of the display. Height H may range from about 150 nanometers to about 6 microns. Polarizer film 608 exhibits thickness T between 1 micron and 1 millimeter and a preferred surface energy from 20 dynes per centimeter (D/cm) to 90 D/cm. While a first and a second plurality of lines are disclosed above at 502 and 514, the above dimensional information may apply to one or both of the pluralities of lines disclosed above.

Printing of High Resolution Conductive Lines

Figure 6:
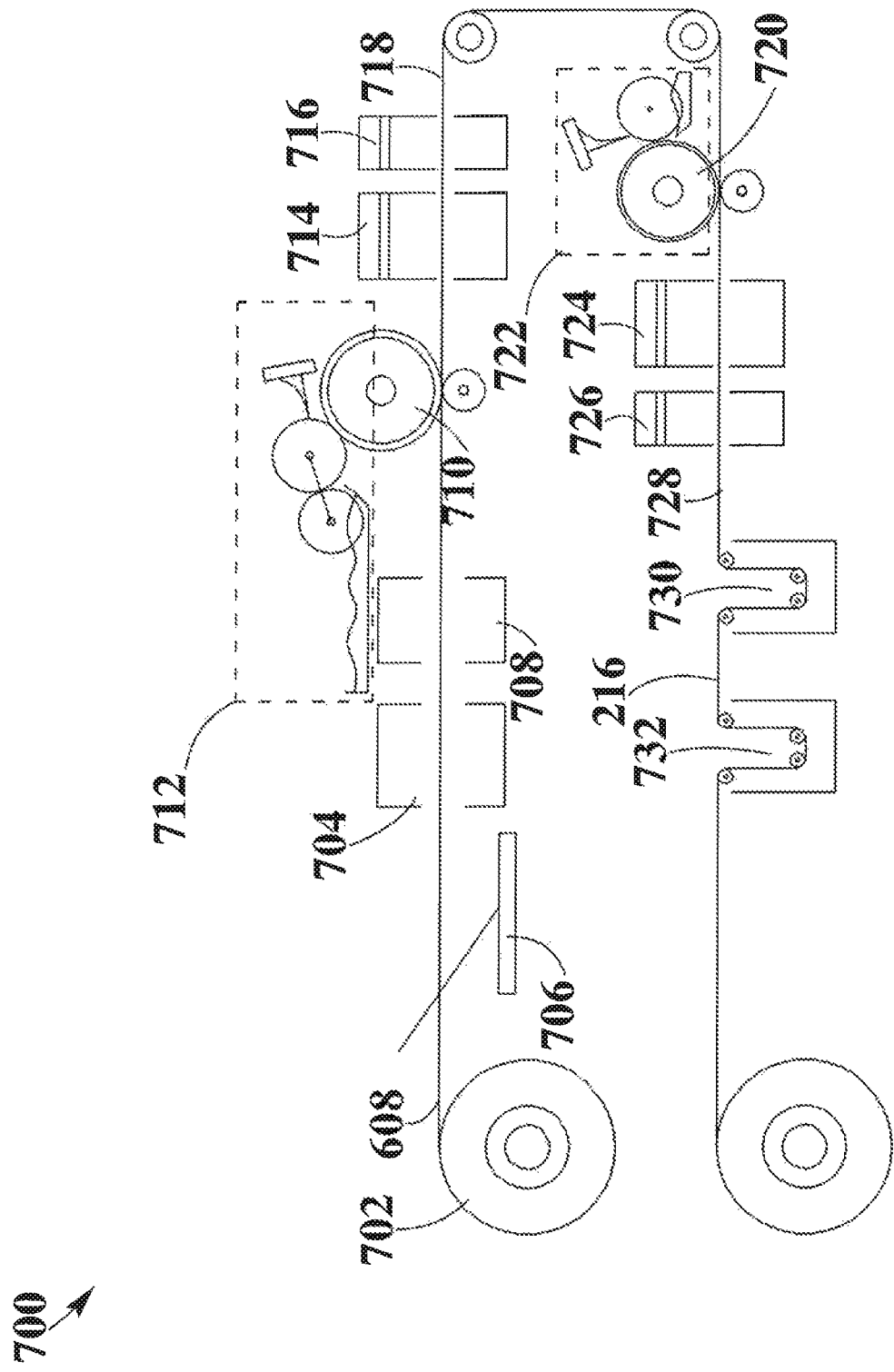
FIG. 6 is an embodiment of a method of manufacturing capacitive touch sensors.

FIG. 6 is an embodiment of a manufacturing method to fabricate a capacitive touch sensor. Manufacturing method 700 is a method to fabricate a capacitive touch sensor. In FIG. 6, an elongated, flexible, thin polarizer film 608 is placed on unwind roll 702. The thickness of polarizer film 608 may be chosen so that it is thin enough to avoid excessive stress during flexing of the touch sensor and, in some embodiments, to improve optical transmissivity, and thin enough as to preserve the continuity of the layer and/or its material properties during the manufacturing process. Preferably, the thickness of the polarizer film 608 may be between 1 micron and 1 millimeter.

Thin polarizer film 608 is transferred, preferably via a roll to roll handling method, from unwind roll 702 to first cleaning station 704. As the roll to roll process involves a flexible material, the alignment of features may be somewhat challenging. Given that printing high resolution lines may be desirable, precision in maintaining the proper alignment may be accounted for in the setup and manufacturing process. In one embodiment positioning cable 706 is used to maintain proper alignment of the features, in other embodiments any known means may be used for this purpose. If the alignment is off, the printing process disclosed below may not proceed correctly, which may result in both cost and safety implications. In some embodiments first cleaning station 704 comprises a high electric field ozone generator. The ozone generated is used to remove impurities such as oil or grease from polarizer film 608.

Then polarizer film 608 passes through a second cleaning at second cleaning station 708. In this particular embodiment, second cleaning station 708 includes a web cleaner. A web cleaner may be any device used in web manufacturing to remove particles from a web or substrate. After cleaning stations 704 and 708, polarizer film 608 passes through a first printing station 712 where a microscopic pattern is printed on one of the sides of polarizer film 608. The microscopic pattern is imprinted by master plate 710 using UV curable ink (not pictured) that may have a viscosity between 200 and 2000 cps. The ink may be a combination of monomers, oligomers, or polymers, metal elements, metal element complexes, or organometallics in liquid state that is discretely applied over a substrate surface. Further, the microscopic pattern comprise lines having a width between 2 and 20 microns and may be similar to the first pattern shown in FIG. 5A. The amount of ink transferred from master plate 710 to polarizer film 608 is regulated by a high precision metering system at first printing station 712 and depends on the speed of the process, ink composition, as well as the pattern shape, dimensions, and cross-sectional geometry of the plurality of lines that comprise the pattern. The speed of the machine may vary from 20 feet per minute (fpm) to 750 fpm, while 50 fpm to 200 fpm seems to be suitable for some applications. The ink may contain plating catalysts. A plating catalyst is a substance that enables a chemical reaction in the plating process.

The first printing process 712, 712, may be followed by a curing process at curing station 714 to form patterned lines from the printed ink pattern. The curing process may refer to the process of drying, solidifying or fixing any coating or ink imprint, previously applied, on a substrate. The curing may comprise ultraviolet light curing station 714 with a target intensity from about 0.5 mW/cm2 to about 50 mW/cm2 and wavelength from about 280 nm to about 480 nm. In addition, the curing process may comprise an oven heating station 716 applies heat within a temperature range of about 20° C. to about 85° C.

The unpatterned bottom side of polarizer film 608 is then printed so as to form a microscopic pattern representing the electrodes of the touch sensor on the opposite side of the film 608 from the electrodes printed as described above. A microscopic pattern is printed on the bottom side of polarizer film 608. The microscopic pattern is imprinted by second master plate 720 using UV curable ink. A pattern similar to the second pattern shown in FIG. 5 may be used. The amount of ink transferred from second master plate 720 to the bottom side of polarizer film 608 is regulated by high precision metering station 722. This second printing process may be followed by a curing step at curing station 724. The curing may comprise ultraviolet light curing station 724 with a target intensity from about 0.5 mW/cm2 to about 50 mW/cm2 and wavelength from about 280 nm to about 480 nm, in addition it may comprise an oven heating (curing) station 726 that applies heat within a temperature range of about 20° C. to about 85° C.

Electro-Less Plating

With printed microscopic patterns on both sides of the polarizer film 608, first patterned lines 718 and bottom patterned lines 728, polarizer film 608 may be exposed to electroless plating station 730. The term "electroless plating" may describe a catalyst activated chemical technique used to deposit a layer of conductive material on to a given surface. The quality of the printed pattern may affect the quality of the plating on that pattern, and the ink used to print the substrate or substrates may contain at least a catalyst that is activated during the plating process. In an embodiment, the deposition of conductive material is performed from 1 nm/min-100 nm/min, preferably from 5 nm/min-15 nm/min.

In this step a layer of conductive material is deposited on the microscopic patterns. This may be accomplished by submerging first patterned lines 718 and bottom patterned lines 728 of polarizer film 608 into an electroless plating station 730 using a tank that contains copper or other conductive material in a liquid state at a temperature range between 20° C. and 90° C., with 80° C. being applied in some embodiments. The deposition rate may be 10 nanometers per minute and within a thickness of about 0.001 microns to about 100 microns, depending on the speed of the web and according to the application. This electroless plating process does not require the application of an electrical current and it only plates the patterned areas containing plating catalysts that were previously activated by the exposure to UV radiation during the curing process. In other embodiments, nickel is used as the plating metal. The copper plating bath may include powerful reducing agents, such as borohydride or hypophosphite, which cause the plating to occur. The plating thickness tends to be uniform compared to electroplating due to the absence of electric fields. Electroless plating may be well suited for complex geometries that may comprise fine features. After the plating station 730, the capacitive touch sensor 216 is formed by the printed conductive lines 718 and 728 on both sides of polarizer film 608.

After electroless plating station 730, capacitive touch sensor 216 may be cleaned at washing station 732 by being submerged into a cleaning tank that contains water at room temperature and dried through the application of air at room temperature. In another embodiment, a passivation step in a pattern spray may be added after the drying step to prevent any dangerous or undesired chemical reaction between the conductive materials and water. In this example, polarizer film 608 is printed on both sides. In a second example, a first film may be printed on one side and a second film may be printed on one side and the films processed as indicated below and then assembled. In a third example, a first film may have two patterns printed on one side of the film, and the film is then processed as indicated below, then cut and assembled. In the second and third examples, the assembly process comprises assembling the two patterns to where the plurality of lines of the first pattern is assembled orthogonally to the plurality of lines of the second pattern to form an x-y grid. This assembly process may comprise cutting or tearing the patterns apart, the substrate may in some embodiments have a mark indicating where to cut, or have perforations making it easier to tear. In an alternate embodiment, the patterns can be folded on each other, wherein they do not need to be separated prior to folding or wherein the folding separates the substrate in between the patterns due, for example, to a marking, indentation, or perforations in the substrate. In some embodiments, the marking or perforations may be added prior to processing, and other embodiments the marking or perforations may be added during processing.

Precision Metering System

Figure 7B:
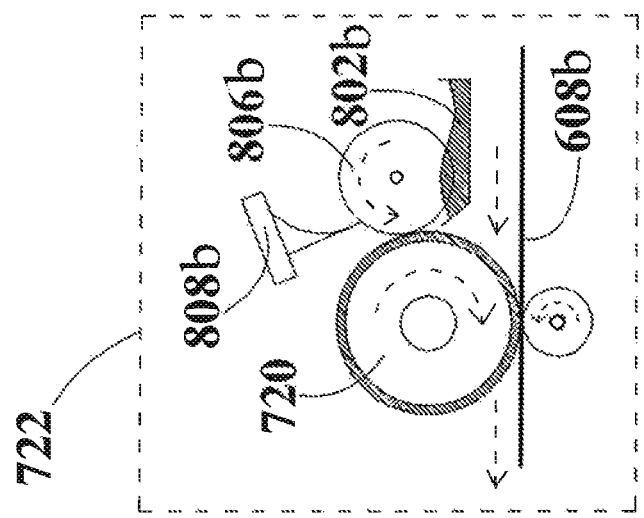
FIGS. 7A-7B are embodiments of high precision ink metering systems.
Figure 7A:
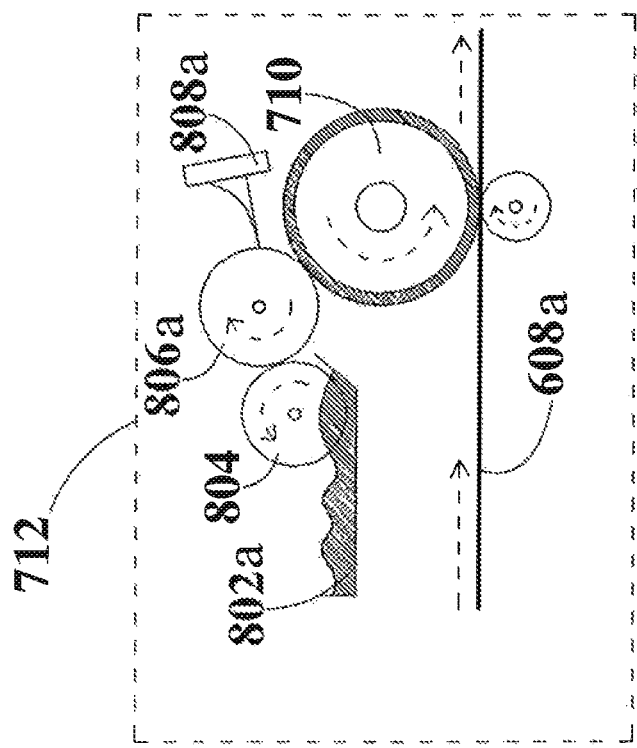

FIGS. 7A and 7B are embodiments of high precisions metering systems. The printing process is where the ink pattern that will ultimately be plated with conductive material is formed. Therefore, the integrity of the printed pattern, the line shape, thickness, uniformity, and pattern formation may impact the integrity of the plated pattern. FIG. 7A is an embodiment of high precision metering stations 712 and FIG. 7B is an embodiment of high precision metering station 722. Both stations 712 and 722 control the amount of ink that is transferred to polarizer film 608 by first master plate 710 in FIG. 7A and second master plate 720 in FIG. 7B as described in both printing steps of manufacturing method 700 in FIG. 6. In a preferred embodiment, the station in FIG. 7A is used to print a first side of a substrate and the station in FIG. 7B is used to print the other (second) side of the substrate. FIG. 7A shows ink pans 802a, transfer roll 804, anilox rollers 806a, doctor blades 808a and the master plate 710. An anilox roll may be a cylinder used to provide a measured amount of ink to a printing plate, more than one roll may be used in a single process and the roll or rolls may be used in conjunction with an ink pan or with a metered ink system. In one embodiment, a portion of the ink contained in ink pan 802a is transferred to anilox roller 806a, which may be constructed of a steel or aluminum core coated by an industrial ceramic whose surface contains millions of very fine dimples, known as cells. Depending on the design of the printing process, anilox roller 806a may be either semi-submersed in ink pans 802a or come into contact with a metering roll (not pictured). Doctor blades 808a are used to scrape excess ink from the surface leaving just the measured amount of ink in the cells. The rollers then rotate to contact with the flexographic master plate 710 which receives the ink from the cells for transfer to polarizer film 608a. The rotational speed of the printing plates should match the speed of the web, which may vary between 20 fpm and 750 fpm. In FIG. 7B, ink is transferred from ink pan 802b to anilox roller 806b. Doctor blades 808b may be used to scrap excess ink from the surface as in FIG. 7A, and the rollers rotate to contact with master plate 720 which transfers the ink to substrate 608b. In an alternate embodiment, substrate 608a is different than substrate 608b.

Final Product Film

Figure 8:
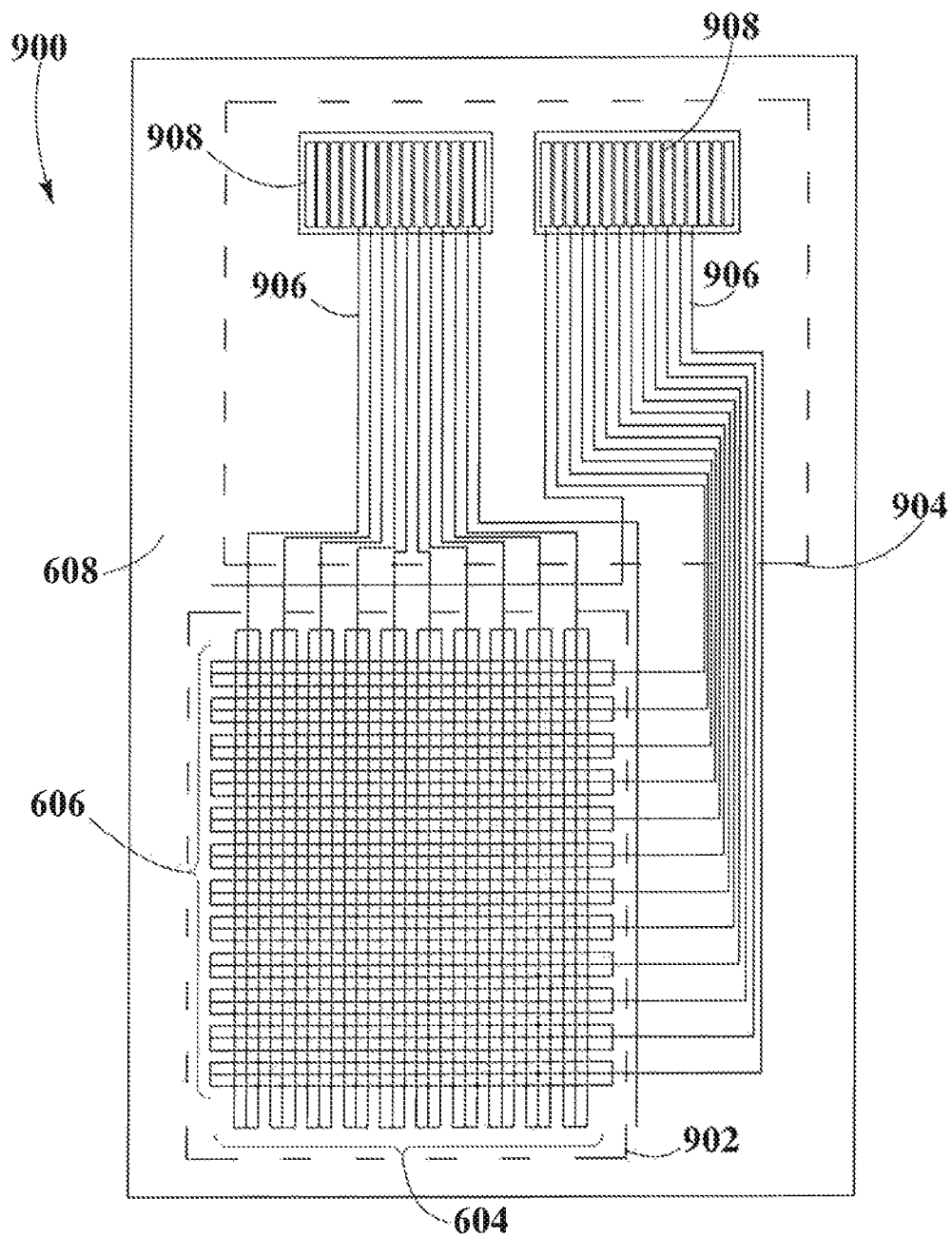
FIG. 8 is an illustration of a top view of an assembled printed touch sensor circuit.

FIG. 8 shows a top view 900 of the capacitive touch sensor 216. Shown in this figure are conductive grid lines 902 which are the electrodes and tail 904 comprising electrical leads 906 and electrical connectors 908. The electrodes 902 and tail 904 are formed by plating the patterns printed by the flexographic printing process disclosed above. These electrodes form an x-y grid that enables the recognition of the point where the user has interacted with the sensor. This grid may have 16×9 conductive lines or more and a size range of, for example, from 2.5 mm by 2.5 mm to 2.1 m by 2.1 m. Top electrodes 604 which are the conductive lines corresponding to the Y axis and were printed on the first side of the polarizer film 608 and bottom electrodes 606 which are the conductive lines corresponding to the X axis were printed on the second side of the polarizer film 608.

Figure 9:
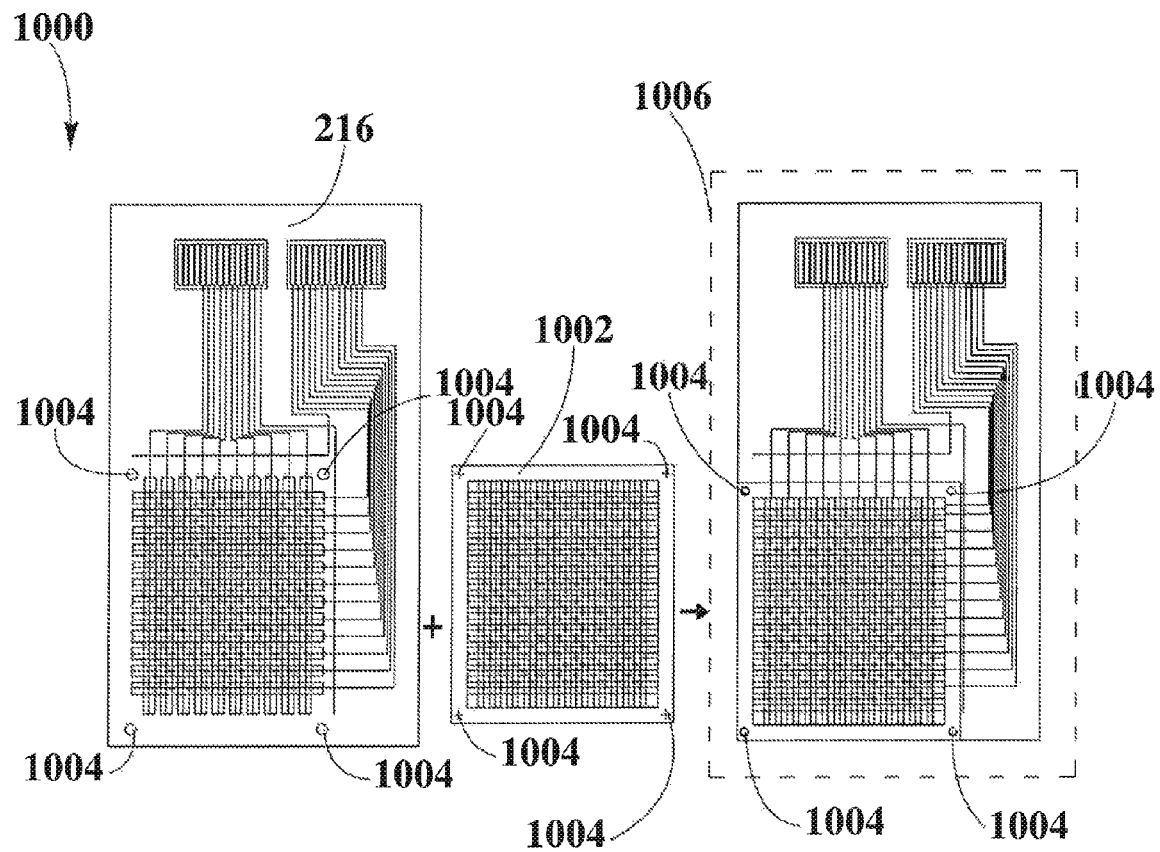
FIG. 9 is an illustration of the assembly of a touch sensor including a black matrix.

FIG. 9 is an illustration of an alignment method. Alignment method 1000 is used to match the position of the touch sensor 216 and black matrix 1002 of a given display. In this particular embodiment touch sensor 216 and black matrix 1002 are aligned using registration marks 1004. Preferably, touch sensor 216 and black matrix 1002 have substantially the same size and shape and be properly aligned as in aligned structure 1006. Other known methods of alignment may also be employed.

Figure 10:
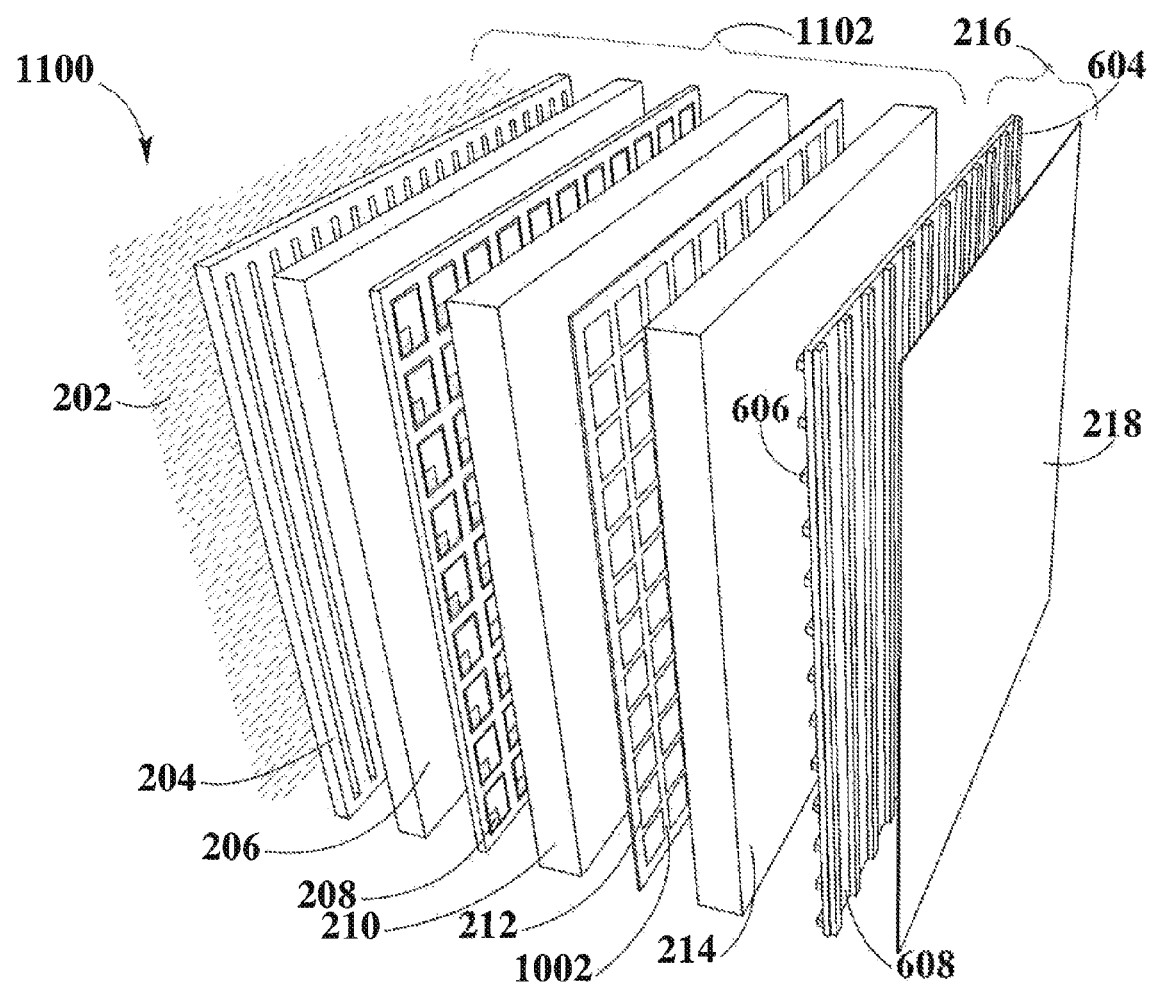
FIG. 10 shows an isometric view of the touch screen configuration.

FIG. 10 shows an exploded isometric view of a display having touch screen structure. The isometric view 1100 may be, for example, of touch screen structure 200 shown in FIG. 2, and may comprise LCD 1102, touch sensor 216, and cover glass 218. LCD 1102, comprises backlight 202, wherein the backlight 202 comprises at least one of a light source, enhancement films, and diffuser plates. The LCD 1102 further comprises polarizer 204 is disposed on backlight 202, and first glass substrate 206 is disposed on the first polarizer 204. A TFT layer 208 is disposed on the glass substrate 206 and liquid crystal cells 210 are disposed on the TFT layer 208. A black matrix 1002 is embedded in RGB filter 212 and is disposed between the liquid crystal cells 210 and a second glass substrate 214. Touch sensor 216 may be disposed on second glass 214. Touch sensor 216 may comprise top electrodes 604 and bottom electrodes 606, wherein the top electrodes 604 and the bottom electrodes 606 were printed, in an embodiment, on two sides of the same polarizer film. In another embodiment, top electrodes 604 were printed on a first side of a first polarizer film 608 and bottom electrodes 606 were printed on a first side of a second film and subsequently assembled. Cover glass 218 may be placed on top of touch sensor 216. In some embodiments, a hard coating (not pictured) may be applied on the outer surface of touch sensor 216.

Figure 11:
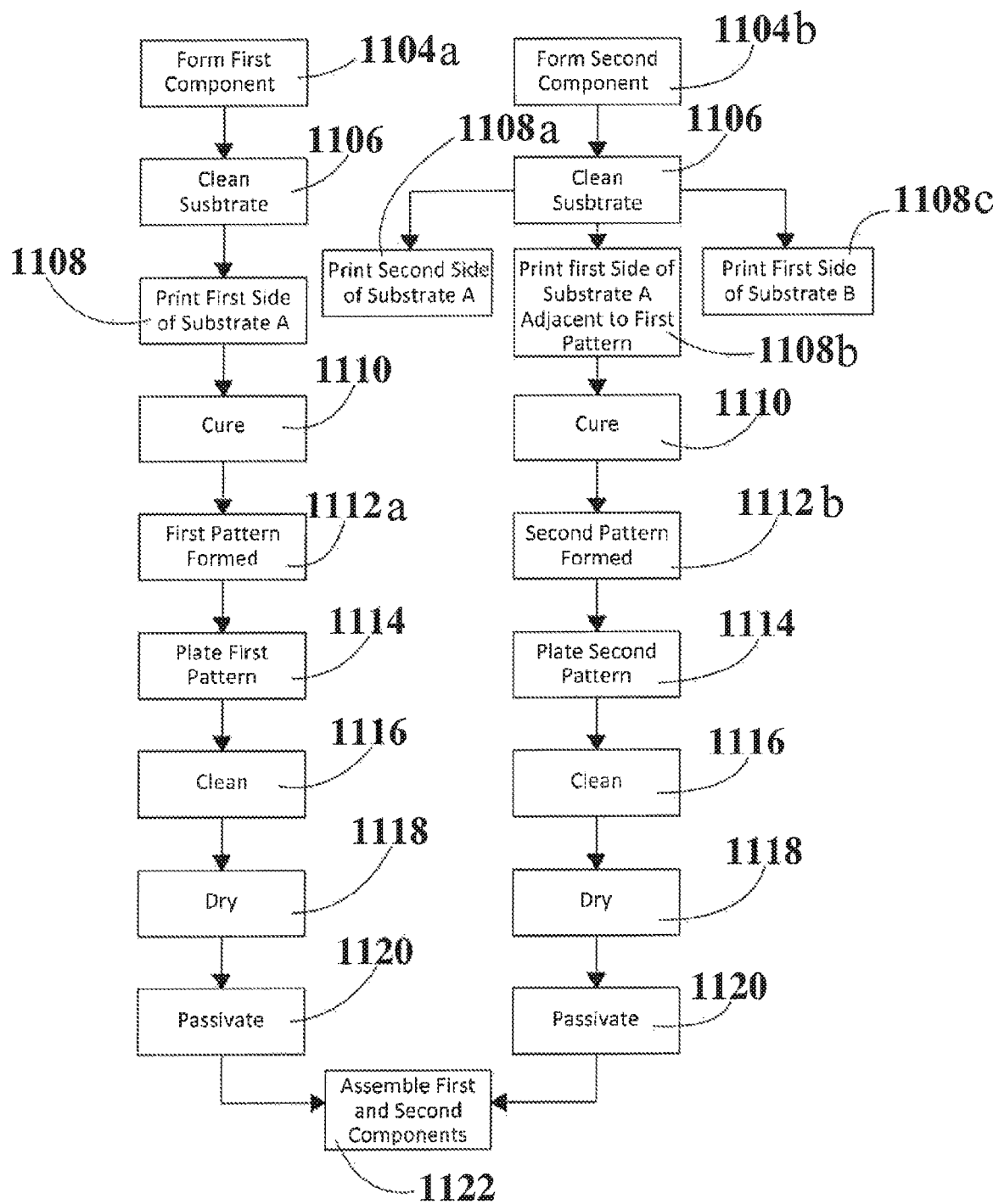
FIG. 11 is an embodiment of a method of manufacturing a capacitive touch sensor.

FIG. 11 is a flow chart of an embodiment of a method of manufacturing a capacitive touch sensor. At 1104a a first component is formed by first cleaning a substrate at first cleaning station 1106, in some embodiments this may comprise more than one cleaning process including web cleaning and high electric field ozone generation. At printing station 1108, a first side of substrate A is printed by flexographic printing using an ink that contains a catalyst wherein a pattern is formed comprising a plurality of lines and a tail. In an embodiment, the substrate is cured at curing station 1110, which may comprise one or more than one curing process such as ultraviolet curing or a heat cure in an oven. Curing at station 1110 forms a first pattern 1112a which can then be plated at plating station 1114. Plating may be performed by, for example, electroless plating where the substrate may be submerged in a tank of an aqueous plating solution comprising a conductive material. The pattern may then be cleaned at second cleaning station 1116 and dried at drying station 1118. In some embodiments, the first component may be passivated at passivation station 1120.

Second component 1104b may be formed consecutively or concurrently with first component 1104a depending upon which method is used. The material used as the substrate for the second component may be cleaned at cleaning station 1106 described above which may comprise one or more cleaning processes. Preferably, the second side of the substrate printed at printing station 1108 is printed at printing station 1108a. In another embodiment, the second pattern may be printed on the first side of the substrate printed at printing station 1108 adjacent to the first pattern at printing station 1108b. In yet another embodiment, a second, different substrate is printed at printing station 1108c. The printing at printing stations 1108a, 1108b, and 1108c produces a second pattern which may be cured at curing station 1110 to form pattern 1112b. Also in all three printing scenarios 1108a-1108c, a pattern is formed comprising a plurality of lines and a tail It would be appreciated that the curing process may be used to bring out the three-dimensional characteristics and features prior to plating. The second pattern is plated at plating station 1114 and may be an electroless plating process as described above. In some embodiments, multiple printing processes using a plurality of rollers and a plurality of inks may be used to form the first pattern, the second pattern, or both. These printing processes may use inks containing a catalyst and each roll may have a different ink. The ink is selected as discussed above based on the size, shape, and complexity of geometry of the pattern. The second plated pattern is cleaned at cleaning station 1116 and may be dried at drying station 1118 and passivated at passivation station 1120.

The first component formed by 1104a and the second component formed by 1104b are assembled at 1122. In the example where the second component is formed using the printing at printing station 1108a, both patterns are on one substrate so assembly may not be needed, however, the substrate may be trimmed or otherwise processed as needed. In the example where the second component is formed using the printing at printing station 1108b, the result at step 1122 is one substrate with two patterns. In this example, the patterns are oriented orthogonally to each other to form what may be referred to as an x-y grid, which means that squares are formed by the lines on each of the plurality of lines in the first and the second patterns. In order to orient the patterns in such a manner, the substrate may be cut, trimmed, torn, or folded over. In some embodiments, the substrate has perforations or other lines of demarcation wherein folding the substrate separates the two patterns. Alternatively, the patterns can be separated by hand or mechanically prior to assembly. In some embodiments, the perforations or lines of demarcation are on the substrate when it is purchased, alternatively, they may be formed prior to printing, and in another example they may be formed during the manufacturing process.

It is understood that the detail drawings and specific examples given describe exemplary embodiments of the present invention and are for the purpose of illustration. The apparatus and method disclosed herein are not limited to the precise details and conditions disclosed It also should be understood that numerous modifications may be made to these illustrative embodiments without departing from the spirit and scope of the present invention as defined by the following claims.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed:

1. A method of producing a capacitive touch sensor using a roll-to-roll handling system comprising:
    printing, by a first flexoplate and a first ink, a first pattern on a first side of a polarizer film, wherein the first pattern comprises a plurality of lines and a first tail;
    printing, by a second flexoplate and a second ink, a second pattern on the first side of the polarizer film, wherein the second pattern comprises a second plurality of lines and a second tail, and wherein the second pattern is printed adjacent to the first pattern;
    curing the printed polarizer film;
    plating the first and the second pattern; and
    assembling the first and the second patterns so that the first plurality of lines is oriented orthogonally to the second plurality of lines.

2. The method of claim 1, further comprising printing the first and the second patterns using a UV-curable ink that comprises a plating catalyst.

3. The method of claim 2, wherein the UV-curable ink has a viscosity between 200-2000 cps.

4. The method of claim 1, wherein printing the first and the second pluralities of lines comprises printing each of the lines of the first and the second plurality of lines with a width between 2 microns-20 microns.

5. The method of claim 1, wherein plating includes electrolessly plating a conductive material on to the first and second patterns at a rate of 1 nm/min-100 nm/min.

6. The method of claim 5, wherein the resistivity of each of the plurality of lines after plating is between 0.05 Ohms per square and 500 Ohms per square.

7. The method of claim 1, wherein plating comprises using conductive material comprising one of copper (Cu), silver (Ag), gold (Au), nickel (Ni), tin (Sn), and Palladium (Pd).

8. The method of claim 1, wherein the first ink and the second ink are the same.

9. The method of claim 1, wherein the first ink and the second ink are different.

10. A method of making a projected capacitance LCD touch screen comprising a capacitive touch sensor, wherein the capacitive touch sensor comprises:
    printing by a flexographic printing process a first pattern on a first side of a first film using a first flexoplate and an ink, wherein the first pattern comprises a first plurality of lines;
    curing the first film;
    plating the first film;
    cleaning a second film;
    printing a second pattern on a first side of the second film using a second flexoplate, wherein the second pattern comprises a second plurality of lines;
    curing the second film;
    plating the second film; and
    assembling the first and the second films so that the first and second pluralities of lines are orthogonal to each other.

11. The method of claim 10, wherein each of the first and second plurality of lines has a cross-sectional geometry that is one of a semi-circle, a trapezoid, a triangle, a rectangle, or a square.

12. The method of claim 10, wherein plating comprises electroless plating to thereby deposit conductive material on the first and second patterns.

13. The method of claim 12, wherein plating further comprises plating using conductive material comprising one of copper (Cu), silver (Ag), gold (Au), nickel (Ni), tin (Sn), and Palladium (Pd).

14. The method of claim 10, wherein printing the first pattern comprises printing a first tail, and wherein printing the second pattern comprises printing a second tail.

15. The method of claim 10, wherein the ink comprises a catalyst.

16. A capacitive touch sensor comprising:
    a flexible polarizer film comprising a first side and a second side, wherein the first side comprises a first pattern printed by a flexographic printing process comprising a first plurality of lines and a first tail, and wherein the second side comprises a second pattern comprising a second plurality of lines and a second tail;
    wherein the first and the second patterns are printed by a flexographic printing process using ink containing a catalyst, and wherein the first and the second patterns are plated by electroless plating using a conductive material; and wherein the first and the second patterns are printed so that the first plurality of lines and the second plurality of lines are oriented orthogonally to each other.

17. The sensor of claim 16, wherein the first and the second tail each comprise a plurality of electrical leads and a plurality of electrical connectors.

18. The sensor of claim 16, wherein the conductive material is deposited at a rate of 1 nm/min-100 nm/min.

19. The sensor of claim 16, wherein the conductive material comprises one of copper (Cu), silver (Ag), gold (Au), nickel (Ni), tin (Sn), and Palladium (Pd).

20. The sensor of claim 16, wherein a cross sectional geometry of the first and the second pluralities of lines comprises one of a rectangle, a square, a trapezoid, a triangle, and a half-circle.

* * * * *